US012735045B2

(12) United States Patent
Rydström et al.

(10) Patent No.: US 12,735,045 B2
(45) Date of Patent: Sep. 15, 2026

(54) RADAR-BASED WHEEL END MODULES FOR DETERMINING WHEEL FORCE GENERATING CAPABILITY

(71) Applicant: VOLVO TRUCK CORPORATION, Gothenburg (SE)

(72) Inventors: Mats Rydström, Billdal (SE); Adithya Arikere, Gothenburg (SE); Mats Jonasson, Partille (SE); Leo Laine, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 56 days.

(21) Appl. No.: 18/640,504

(22) Filed: Apr. 19, 2024

(65) Prior Publication Data

US 2024/0367636 A1 Nov. 7, 2024

(30) Foreign Application Priority Data

May 1, 2023 (SE) .................................... 2330191-4

(51) Int. Cl.
*B60W 40/068* (2012.01)
*B60W 10/22* (2006.01)
(Continued)

(52) U.S. Cl.
CPC .......... *B60W 40/068* (2013.01); *B60W 10/22* (2013.01); *B60W 40/12* (2013.01);
(Continued)

(58) Field of Classification Search
CPC .... B60W 40/068; B60W 40/12; B60W 40/10; B60W 10/22; B60W 2300/125;
(Continued)

(56) References Cited

U.S. PATENT DOCUMENTS 3,363,253 A 1/1968 Ratkevich et al.
4,845,506 A 7/1989 Shibata et al.
(Continued)

FOREIGN PATENT DOCUMENTS

DE 102012220238 A1 5/2014
DE 102017210964 A1 1/2019
(Continued)

OTHER PUBLICATIONS

Extended European Search Report dated Sep. 10, 2024 in corresponding European Patent Application No. 24169590.7, 11 pages.
(Continued)

*Primary Examiner* — George C Jin
(74) *Attorney, Agent, or Firm* — Jeffri A. Kaminski; Venable LLP

(57) ABSTRACT

A wheel end module for a heavy-duty vehicle includes a processing device, a radar module arrange to transmit a radar signal towards a surface supporting the vehicle and to receive backscatter from the radar signal, and a load sensing arrangement. The processing device determines a parameter related to a normal force associated with at least one wheel of the heavy-duty vehicle by the load sensing arrangement, determines a parameter related to a friction coefficient of the surface by the radar module. The processing device determines a wheel force generating capability of the at least one wheel, based on the normal force related parameter and on the friction coefficient related parameter. The wheel end module outputs the wheel force generating capability on an output interface of the wheel end module.

15 Claims, 5 Drawing Sheets

(51) Int. Cl.
*B60W 40/12* (2012.01)
*G01S 13/08* (2006.01)
*G01S 13/60* (2006.01)
*G01S 13/88* (2006.01)

(52) U.S. Cl.
CPC ............ *G01S 13/08* (2013.01); *G01S 13/605* (2013.01); *G01S 13/88* (2013.01); *B60W 2300/125* (2013.01); *B60W 2420/408* (2024.01); *B60W 2422/10* (2013.01); *B60W 2520/26* (2013.01); *B60W 2520/28* (2013.01); *B60W 2530/10* (2013.01); *B60W 2552/40* (2020.02)

(58) Field of Classification Search
CPC B60W 2420/408; G01S 13/08; G01S 13/605; G01S 13/88
See application file for complete search history.

(56) References Cited

U.S. PATENT DOCUMENTS 5,621,413 A * 4/1997 Lempkowski .......... G01S 13/60 342/115
10,183,676 B2 * 1/2019 Hoare .................. B60W 40/06
2011/0264300 A1 * 10/2011 Tuononen ............... B60T 8/172 701/1
2014/0138802 A1 5/2014 Starostine et al.
2015/0375753 A1 * 12/2015 Schräbler ............ B60W 40/068 356/445
2017/0254897 A1 9/2017 Tron et al.
2018/0217231 A1 8/2018 Stanley et al.
2022/0063347 A1 * 3/2022 Sharma ................. B60C 11/246
2022/0126834 A1 * 4/2022 Schiffmann ............. B60T 8/172
2022/0169256 A1 * 6/2022 Beal .................... B60W 40/068
2022/0172492 A1 6/2022 Laine et al.
2023/0271594 A1 * 8/2023 Chen ..................... B60W 10/18 701/70

FOREIGN PATENT DOCUMENTS

DE 102019202772 A1 9/2020
EP 0095300 A2 11/1983
EP 2653882 A1 10/2013
EP 3562702 A1 11/2019
JP H10288559 A 10/1998
JP 2008170237 A 7/2008
WO 2012087150 A1 6/2012
WO 2018124971 A1 7/2018
WO 2019209292 A1 10/2019
WO 2022214174 A1 10/2022

OTHER PUBLICATIONS

Swedish Search Report in corresponding Swedish Patent Application No. 2330191-4 mailed Nov. 29, 2023 (2 pages).
Vessen Vassilev. 2022. "Road Surface Recognition at mm-Wavelengths Using a Polarimetric Radar"; IEEE Transactions on Intelligent Transportation Systems; vol. 23; Issue 7; Jul. 2022; pp. 6985-6990; https://doi.org/10.1109/TITS.2021.3066312.
"Tyre and vehicle dynamics", Elsevier Ltd. 2012, ISBN 978-0-08-097016-5, by Hans Pacejka, 400 pages.
"Fundamentals of Vehicle Dynamics" Warrendale, PA: Society of Automotive Engineers, 1992, 3 pages.
Lecture notes "Introduction to mmwave Sensing: FMCW Radars" by Sandeep Rao, Texas Instruments, 2017, 70 pages.

* cited by examiner

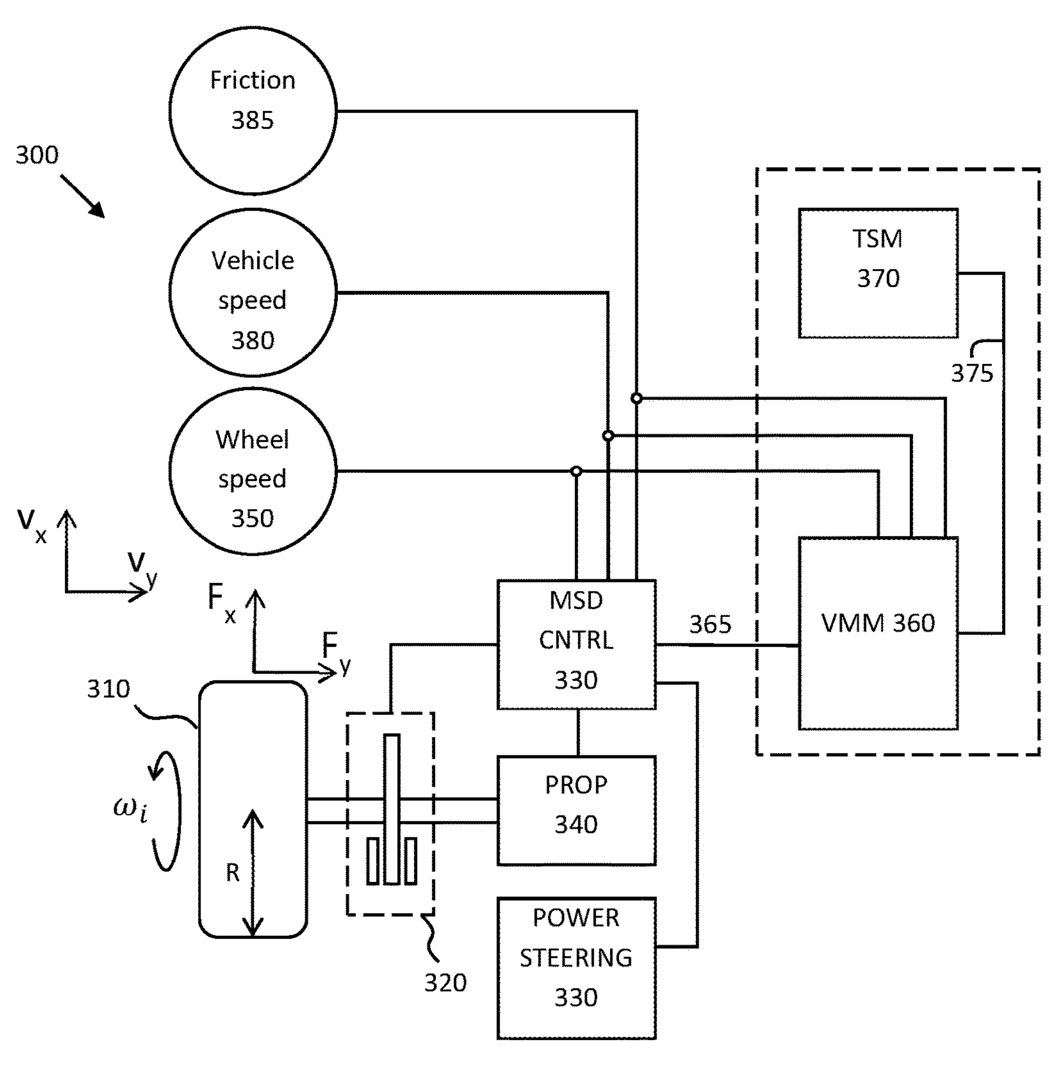
FIG. 3
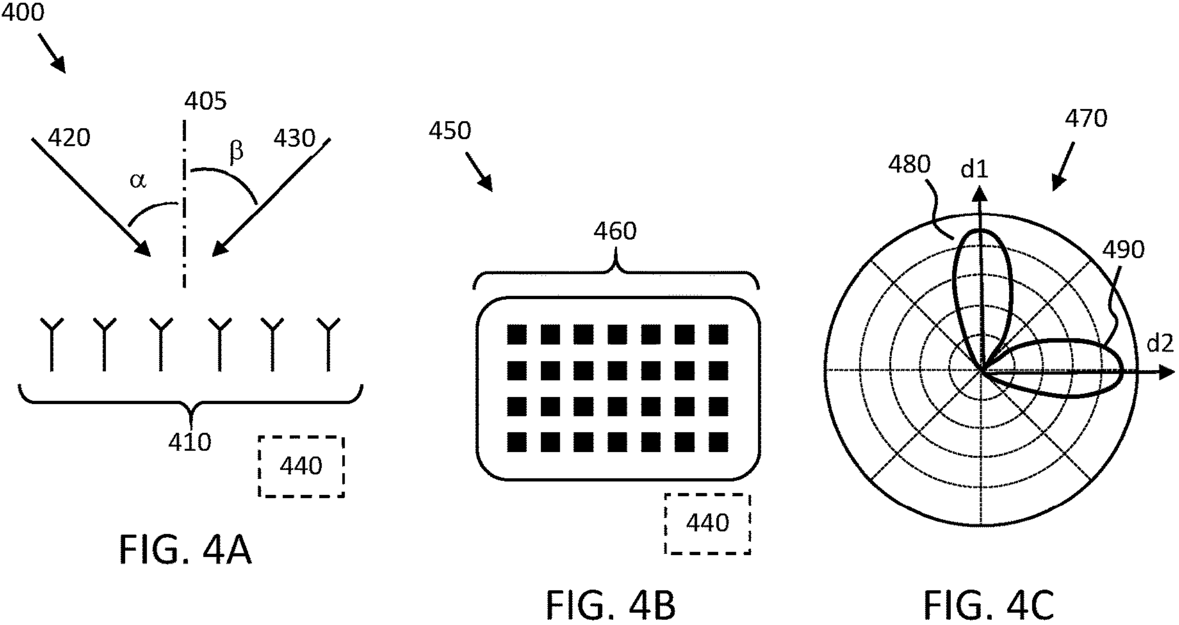
FIG. 4A
FIG. 4B
FIG. 4C

RADAR-BASED WHEEL END MODULES FOR DETERMINING WHEEL FORCE GENERATING CAPABILITY

TECHNICAL FIELD

The present disclosure relates to methods and control units for ensuring safe and efficient vehicle motion management of a heavy-duty vehicle. The methods are particularly suitable for use with cargo transporting vehicles, such as trucks and semi-trailers. The invention can, however, also be applied in other types of heavy-duty vehicles, e.g., in construction equipment and in mining vehicles, as well as in passenger cars.

BACKGROUND

Vehicle motion management (VMM) refers to control of vehicle actuators such as propulsion, braking, and steering actuators in order to obtain a desired behavior by the vehicle. VMM in a modern heavy-duty vehicle involves both vehicle state estimation, i.e., the determination of how the vehicle moves relative to the road surface or in some other reference system, and control of vehicle motion support devices (MSD) such as propulsion devices, brakes, and steering actuators in order to obtain a desired motion behavior.

There is a general desire to improve both vehicle state estimation and MSD control in heavy-duty vehicles, especially in challenging operating conditions.

SUMMARY

It is an objective of the present disclosure to provide improved methods for estimating vehicle motion state and for controlling motion of the heavy-duty vehicle. The objective is at least in part obtained by a wheel end module for a heavy-duty vehicle. The wheel end module comprises a processing device and a load sensing arrangement, as well as a dual polarized radar module arranged to transmit a radar signal towards a surface supporting the vehicle and to receive backscatter from the surface. The processing device is arranged to determine a parameter related to a normal force associated with at least one wheel of the heavy-duty vehicle by the load sensing arrangement. The processing device is also arranged to determine a parameter related to a friction coefficient of the surface by the radar module, and to determine a wheel force generating capability of the at least one wheel, based on the normal force related parameter and on the friction coefficient related parameter. This allows the wheel end module to output a wheel force generating capability for at least one wheel of the heavy-duty vehicle on an output interface of the wheel end module, e.g., to higher layer control functions that may optimize vehicle motion management in dependence of the determined wheel force generating capability. This allows the higher layer control functions to better control motion by the vehicle since wheel force generating capability of at least one wheel of the heavy-duty vehicle is known. Consequently, the higher layer control function can balance the motion requests so as to not exceed the wheel force generating capability of the wheels on the vehicle.

Advanced vehicle motion management often relies on coordination of several MSDs in order to obtain a desired vehicle motion in a safe manner. A challenge associated with such coordination is that wheel force generating capability of the different wheels on the vehicle is not known with sufficient accuracy, which complicates MSD coordination, and may even jeopardize vehicle safety in some cases. However, by the wheel end modules disclosed herein, this important information can be obtained in a reliable and cost efficient manner.

The processing device may in some cases be arranged to determine the normal force related parameter as a preconfigured default value, i.e., as a worst case value, as an average value or as some other nominal value. Hence, it is appreciated that most of the advantages discussed above can also be obtained even for very rudimentary load sensing arrangement. The preconfigured default value can be set as function of vehicle type, or manually configured according to vehicle normal use. The normal force related parameter can also be estimated from vehicle behavior using methods known in the art.

According to some aspects, the load sensing arrangement of the wheel end module comprises a suspension displacement sensor and/or a suspension bellow pressure sensor arranged in connection to the at least one wheel. The processing device can then be arranged to determine the normal force related parameter at least in part based on a predetermined relation between normal force and suspension displacement and/or suspension bellow pressure. This allows the wheel end module to obtain reliable information related to current wheel normal force in a cost efficient manner, which is an advantage.

The radar module used for determining road friction can also be used to determine a distance to the surface in connection to the at least one wheel based on the same radar signal as was used for the road friction determination. The processing device can then determine the normal force related parameter at least in part based on the distance to the surface and on a predetermined relation between normal force and distance to the surface, since a load on the vehicle compresses the suspension, i.e., moves the radar transceiver closer to the surface, and vice versa. This way the wheel end module can determine wheel force generating capability using only a single radar transceiver for both friction and normal force, which is an advantage. The radar transceiver can be implemented in a cost-efficient manner, and hence the wheel end module may be realized without prohibitive cost. The same radar can also be used to determine vehicle or wheel speed over ground, giving additional valuable information for advanced VMM systems, as will be discussed in more detail below. Determination of the normal force related parameter based on suspension operating state can be combined with determination of the normal force related parameter based on distance from the radar transceiver to the surface supporting the vehicle in order to obtain a more reliable estimation of normal force.

The radar module of the wheel end module can, according to some aspects, be configured to determine a velocity of the at least one wheel with respect to the surface supporting the heavy-duty vehicle, in which case the wheel end module is preferably arranged to also output the velocity on the output interface. Thus, the wheel end module provides velocity information in addition to the wheel force generating capability of one or more wheels, which is an advantage.

The wheel end module optionally comprises at least one wheel speed sensor (or an interface to a wheel speed sensor) arranged to determine respective rotational velocities of the at least one wheel. In this case the processing device can be arranged to determine a wheel slip and/or a slip angle of the at least one wheel based on the rotational velocity and on the velocity of the at least one wheel with respect to the surface. The wheel end module is preferably arranged to output the wheel slip and/or the slip angle on the output interface, adding even more valuable information to the wheel end module output which can be used by higher layer control functions to control the heavy-duty vehicle.

The objective is also at least in part obtained by a vehicle motion management system for a heavy duty vehicle. The system comprises one or more dual polarized radar modules configured to determine respective velocities of the heavy-duty vehicle with respect to a surface supporting the vehicle, based on respective radar signals transmitted towards the surface. The radar modules are also arranged to determine respective parameters related to surface friction, as discussed above. The VMM system comprises an MSD coordination function arranged to coordinate one or more MSDs of the heavy-duty vehicle based on the determined friction coefficient related parameters, and preferably also based on the determined velocities of the heavy-duty vehicle in relation to desired motion by the vehicle. This way a reliable and efficient VMM function can be obtained which more seldom allocates wheel forces to wheel actuators that cannot be fulfilled because they exceed the wheel force generating capabilities of the different wheel on the vehicle, since the road friction is now at least approximately known by the VMM system. The VMM system is preferably arranged to determine wheel force generating capabilities of one or more wheels of the heavy-duty vehicle at least partly based on the determined friction coefficient related parameters, either by computing or approximating the capabilities using preconfigured relationships or by receiving the capability information from one or more wheel end modules over respective interfaces.

The MSD coordination function can then be configured to coordinate one or more MSDs of the heavy-duty vehicle based on the determined wheel force generating capabilities, which is an advantage.

According to some aspects, the VMM system is arranged to determine an operational design domain (ODD) of the heavy-duty vehicle comprising a maximum longitudinal velocity and/or a maximum lateral velocity at least partly based on the friction coefficient related parameters, and to output the ODD to a traffic situation management (TSM) system of the heavy-duty vehicle. This way the TSM system obtained valuable information about wheel force generating capabilities, which allows it to adjust the requests from the actuators to levels that can be fulfilled, i.e., where the requested wheel forces are within the capabilities of the different wheel actuators.

There is also disclosed herein radar modules, control units, vehicles, computer programs, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages, will be better understood through the following illustrative and non-limiting detailed description of exemplary embodiments, wherein:

FIG. 3 shows an example motion support device control arrangement;

FIGS. 4A-C illustrate example radar systems comprising antenna arrays;

DETAILED DESCRIPTION

Figure 1:
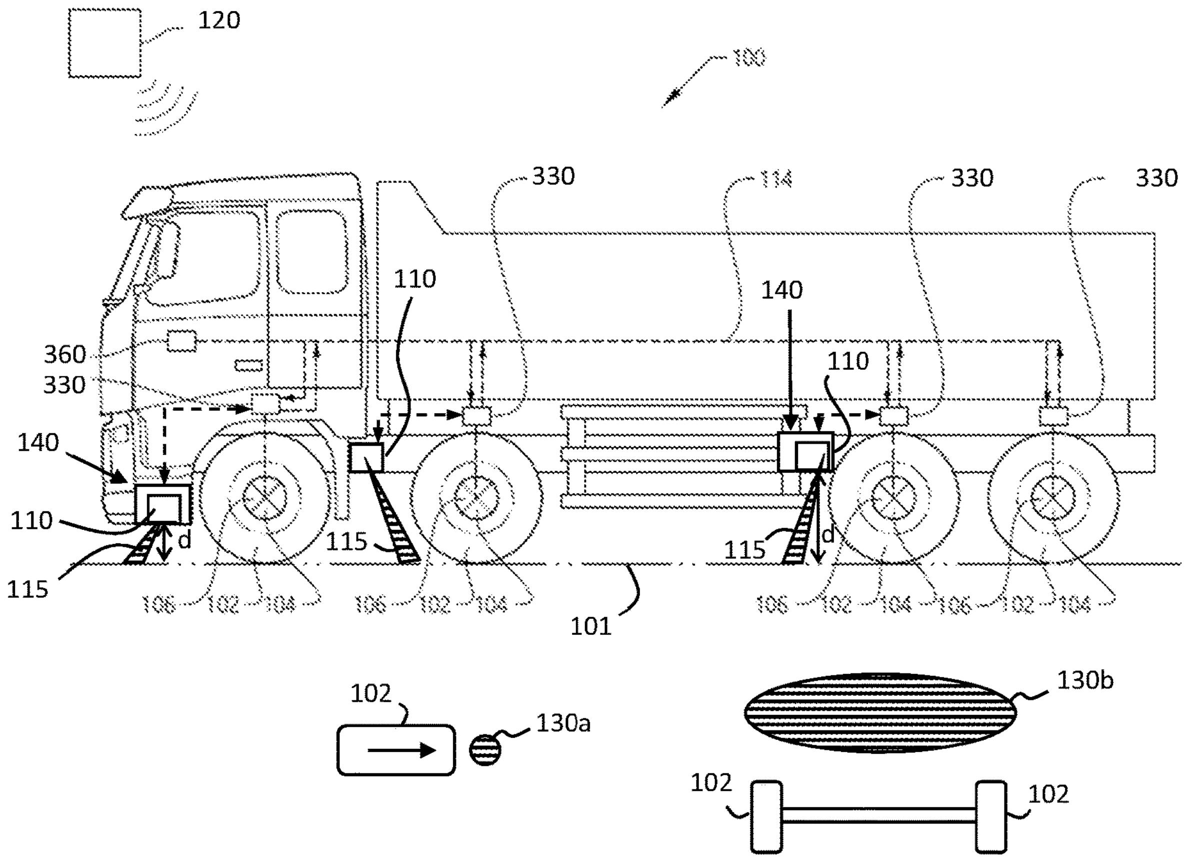
FIG. 1 illustrates an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference characters refer to like elements throughout the description.

FIG. 1 illustrates an example heavy-duty vehicle 100, here in the form of a truck. A heavy-duty vehicle may be taken to mean a motor vehicle rated at more than 8,500 pounds Gross Vehicle Weight Rating (GVWR), which is about 3855 kg. A heavy-duty vehicle may also be taken to mean a motor vehicle that has a basic vehicle frontal area in excess of 45 square feet, which is about 4.2 $m^2$. Examples of heavy-duty vehicles include trucks, semi-trailers, and the like. It is appreciated that the herein disclosed methods and control units can be applied with advantage also in other types of heavy-duty vehicles, such as trucks with drawbar connections, construction equipment, buses, and the like.

The example vehicle 100 comprises a plurality of wheels 102, where at least a subset of the wheels 102 comprise a respective motion support device (MSD) 104. The vehicle 100 may also comprise more than two vehicle units, i.e., a dolly vehicle unit may be used to tow more than one trailer. Some aspects of the herein proposed techniques are particularly suitable for articulated vehicles such as semi-trailers, as will be discussed in more detail below in connection to FIG. 6. Aspects of the disclosure may also be implemented in smaller vehicles such as passenger cars and the like.

The MSDs 104 may be arranged for generating a torque on the respective wheel of the vehicle or for both wheels of an axle. The MSD may be a propulsion device, such as an electric machine 106 arranged to e.g., provide a longitudinal wheel force to the wheel(s) of the vehicle 100. Such an electric machine may thus be adapted to generate a propulsion torque as well as to be arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking. The electric machines may be integrally formed with respective wheel end modules as will be discussed in more detail below.

The MSDs 104 may also comprise friction brakes such as disc brakes or drum brakes arranged to generate a braking torque by the wheel 102 in order to decelerate the vehicle. Herein, the term acceleration is to be construed broadly to encompass both positive acceleration (propulsion) and negative acceleration (braking).

Moreover, each of the MSDs 104 is connected to a respective MSD control system or control unit 330 arranged for controlling operation of the MSD 104. The MSD control system is preferably a decentralized motion support system of control units, although centralized implementations are also possible. It is furthermore appreciated that some parts of the MSD control system may be implemented on processing circuitry remote from the vehicle, such as on a remote server 120 accessible from the vehicle via wireless link. Furthermore, each MSD control unit 330 is connected to a VMM system 360 of the vehicle 100 via a data bus communication arrangement 114 that can be either wired, wireless or both wired and wireless. Hereby, control signals can be transmitted between the vehicle motion management system 360 and the MSD control units 330. The vehicle motion management system 360 and the MSD control units 330 will be described in further detail below with reference to FIG. 3 and FIG. 5.

The VMM system 360, sometimes referred to herein as a VMM function, as well as the system of MSD control units 330 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 7. It is appreciated that the different control units and processing devices referred to herein are possible to realize by general processing circuitry known in the art.

Generally, the MSDs on the vehicle 100 may also be realized as, e.g., a power steering device, an active suspension device, and the like. Although these types of MSDs cannot be used to directly generate longitudinal force to accelerate or brake the vehicle, they are still part of the overall vehicle motion management of the heavy-duty vehicle and may therefore form part of the herein disclosed methods for vehicle motion management. Notably, the MSDs of the heavy-duty vehicle 100 are often coordinated in order to obtain a desired motion by the vehicle. For instance, two or more MSDs may be used jointly to generate a desired propulsion torque or braking torque, a desired yaw motion $v_W$ by the vehicle, or some other dynamic behavior. Coordination of MSDs will be discussed in more detail in connection to FIG. 5. During coordination of the MSDs, it is beneficial if the capabilities of the different MSDs are known at the VMM system 360. For instance, general vehicle motion management is improved if the VMM system 360 has at least some notion of the wheel force generating capabilities of the different wheels on the vehicle 100. The present disclosure seeks to provide wheel end modules that provide information on wheel force generating capability of an associated wheel, or the wheels of an associated wheel axle.

Herein, longitudinal speed over ground may be determined relative to the vehicle, in which case the speed direction refers to the forward direction of the vehicle or relative to a wheel, in which case the speed direction refers to the forward direction, or rolling direction, of the wheel. The same is true for lateral speed over ground, which can be either a lateral speed of the vehicle or a lateral speed over ground of a wheel relative to its rolling direction. The meaning will be clear from context, and it is appreciated that a straight forward conversion can be applied in order to translate speed over ground between the coordinate system of the vehicle and the coordinate system of the wheel, and vice versa. Vehicle and wheel coordinate systems are discussed, e.g., by Thomas Gillespie in "Fundamentals of Vehicle Dynamics" Warrendale, PA: Society of Automotive Engineers, 1992.

Longitudinal wheel slip $\lambda_x$ may, in accordance with SAE J370 (SAE Vehicle Dynamics Standards Committee Jan. 24, 2008) be defined as $$\lambda_x = \frac{R\omega_i - v_x}{\max(|R\omega_i|, |v_x|)}$$

where R is an effective wheel radius in meters, $\omega_i$ is the angular velocity of the i-th wheel on the vehicle 100, and $v_x$ is the longitudinal speed of the wheel (in the coordinate system of the wheel). Thus, $\lambda_x$ is bounded between −1 and 1 and quantifies how much the wheel is slipping with respect to the road surface. The two terms road surface and surface are used interchangeably herein. Both terms refer to the surface supporting the vehicle 100, which is also the reference for the vehicle speed over ground in lateral and longitudinal directions. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. The VMM 360 and optionally also the MSD control units 330 maintain information on $v_x$ in the reference frame of the wheel, while a wheel speed sensor or the like can be used to determine $\omega_i$ (the rotational velocity of the wheel).

Slip angle $\alpha$, also known as sideslip angle, is the angle between the direction in which a wheel is pointing and the direction in which it is actually traveling (i.e., the angle between the longitudinal velocity component $v_x$ and the vector sum of wheel forward velocity $v_x$ and lateral velocity $v_y$. This slip angle results in a force, the cornering force, which is in the plane of the contact patch and perpendicular to the intersection of the contact patch and the midplane of the wheel. The cornering force increases approximately linearly for the first few degrees of slip angle, then increases non-linearly to a maximum before beginning to decrease.

The slip angle, $\alpha$ of a wheel is often defined as $$\alpha = \arctan\left(\frac{v_y}{|v_x|}\right)$$

where $v_x$ is the longitudinal speed of the wheel and $v_y$ is the lateral speed of the wheel, in the coordinate system of the wheel. It is appreciated that $v_x$, $v_y$, and $\alpha$ differs between wheels, depending on the motion of the vehicle 100. Hence, it may be advantageous to deploy wheel end modules 140 in connection to the different wheels on the vehicle 100, or in connection to the different wheel axles on the vehicle 100, in order to obtain accurate information of vehicle motion.

In order for a wheel (or tyre) to produce a wheel force which affects the motion state of the heavy-duty vehicle, such as an acceleration or a deceleration (a negative acceleration), wheel slip must occur. For smaller slip values the relationship between slip and generated force is approximately linear, where the proportionality constant is often denoted as the slip stiffness $C_x$ of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force F by the wheel since, normally, $F_x \leq \mu F_z$, where y is a friction coefficient associated with a road friction condition. The techniques disclosed herein seek to provide wheel end modules 140, systems, and methods that determine both μ and $F_z$ for at least some of the wheels 102 on the vehicle 100, and/or for one or more axles of the vehicle 100, at least approximately.

Figure 2:
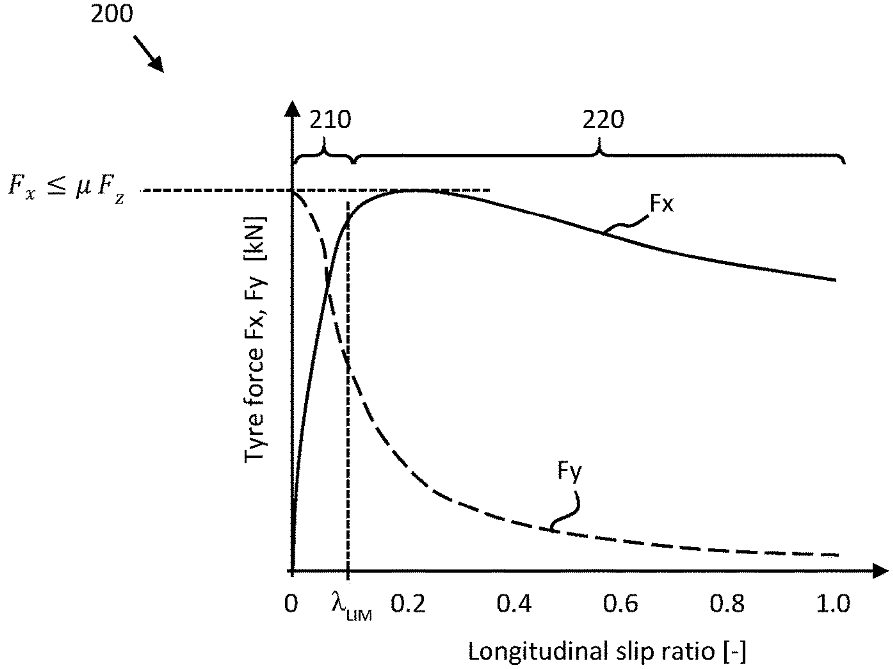
FIG. 2 is a graph showing example tyre forces as function of wheel slip.

FIG. 2 is a graph showing an example 200 of achievable tyre forces as function of longitudinal wheel slip. $F_x$ is the longitudinal tyre force while $F_y$ is the maximum obtainable lateral wheel force for a given wheel slip. This type of relationship between wheel slip and generated tyre force is often referred to as an inverse tyre model, and it is generally known. The examples in FIG. 2 are for positive wheel forces, i.e., acceleration. Similar relationships exist between wheel slip and negative wheel force, i.e., braking. The maximum available lateral force for a given wheel slip can be described by the so-called Magic Formula as described in "Tyre and vehicle dynamics", Elsevier Ltd. 2012, ISBN 978-0-08-097016-5, by Hans Pacejka, where wheel slip and tyre force is also discussed in detail.

An inverse tyre model can be used to translate between a desired longitudinal tyre force $F_x$ and longitudinal wheel slip $\lambda_x$. The interface between VMM and MSDs capable of delivering torque to the vehicle's wheels has as mentioned above traditionally been focused on torque-based requests to each MSD from the VMM without any consideration towards wheel slip. However, this approach has some performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Significant benefits can be achieved by instead using a wheel speed or wheel slip-based request on the interface between VMM 360 and the MSD controller or controllers 330, thereby shifting the difficult actuator speed control loop to the MSD controllers, which generally operate with a much shorter sample time compared to that of the VMM system. Such an architecture can provide much better disturbance rejection compared to a torque-based control interface and thus improves the predictability of the forces generated at the tyre road contact patch.

Referring again to FIG. 2, the example longitudinal tyre force $F_x$ shows an almost linearly increasing part 210 for small wheel slips, followed by a part 220 with more non-linear behavior for larger wheel slips. It is desirable to maintain vehicle operation in the linear region 210, where the obtainable longitudinal force in response to an applied brake command is easier to predict, and where enough lateral tyre force can be generated if needed. To ensure operation in this region, a wheel slip limit $\lambda_{lim}$ on the order of, e.g., 0.1 or so, can be imposed on a given wheel. Thus, having accurate knowledge of current wheel slip, operation in the linear region can be ensured, which greatly simplifies vehicle motion control for both safety, efficiency, and driver comfort. Knowledge of current longitudinal wheel slip $\lambda_x$ together with knowledge about current wheel force generating capability, i.e., $\mu F_z$ also provides important information about the ability by a given wheel to generate lateral force.

A problem encountered when using wheel slip to actively control one or more wheels on a heavy-duty vehicle, such as the vehicle 100, and also when executing more low complex control such as imposing the above-mentioned wheel slip limit $\lambda_{lim}$ locally at wheel end, is that the speed over ground $v_x$ of the wheel (and of the vehicle) may not be accurately known. For instance, if wheel speed sensors such as Hall effect sensors or rotational encoders are used to determine vehicle speed over ground, then the vehicle speed over ground will be erroneously determined in case the wheels used for estimating the speed over ground are themselves slipping. Also, vehicle speed over ground determined based on wheel rotation is one-dimensional, i.e., the method does not allow determining a wheel lateral speed over ground $v_y$ in addition to the longitudinal speed over ground $v_x$, i.e., a speed vector in two dimensions. This of course makes estimating the sideslip angle α challenging.

Satellite based positioning systems can be used to determine the speed over ground of a heavy-duty vehicle 100 and of any given wheel on the vehicle 100. However, these systems do not function well in some environments, such as environments without a clear view of the sky. Multipath propagation of the satellite radio signals can also induce large errors in the estimated vehicle position, which then translates into errors in the estimated vehicle speed over ground.

Vision-based sensor systems and radar systems can also be used to determine vehicle speed over ground. However, such systems are relatively costly and not always without issues when it comes to accuracy and reliability. Vision-based sensors may for instance suffer from performance degradation due to sun glare while radar sensor systems may be prone to interference from other radar transceivers.

The present disclosure proposes the use of radar to determine both longitudinal and lateral velocity of a vehicle with respect to ground. With reference to FIG. 1, a radar module 110 can be configured to determine a two-dimensional velocity vector $[v_x, v_y]$ of a heavy-duty vehicle 100 with respect to a surface or road surface 101 supporting the vehicle 100. This type of radar system comprises a radar transceiver arranged to transmit and to receive a radar signal 115 via an antenna array. The radar modules 110 may be integrated in wheel end modules 140 as will be discussed herein, or arranged in a stand-alone manner.

The principle of determining speed over ground exploited herein builds on the disclosure of US 2004/0138802, but optionally comprises a more efficient implementation due to that a single radar transceiver module comprising an antenna array and a processing device capable of angle-of-arrival radar signal processing is used to determine velocity in two dimensions, whereas US 2004/0138802 uses separate radar transceivers for each dimension.

Ground speed radar systems have been proposed previously in numerous disclosures in addition to the disclosure of US 2004/0138802. However, these systems are all associated with analog fixed direction receive beamforming based, e.g., on Janus antenna configurations. The systems discussed herein uses more modern array signal processing to extract information related to the speed over ground of the heavy-duty vehicle from received radar signal energy inbound from at least two different azimuth directions by detecting first and second radar signal components of the received radar signal based on their respective angles of arrival. In other words, a single antenna array is used to receive radar signal energy simultaneously from a plurality of different azimuth directions, and to separate the different radar signal components from each other based on their angles of arrival.

U.S. Pat. No. 4,845,506 describes an antenna system suitable for use in ground speed radar systems such as those discussed herein. A switch is implemented that can be used to direct the antenna lobe in either of two fixed directions. The antenna can be used to determine longitudinal velocity of a vehicle if the two directions are aligned with the forward directions of a vehicle, and also lateral velocity of the vehicle if another separate antenna system is mounted on the vehicle with the two directions aligned laterally compared to the forward direction of the vehicle. U.S. Pat. No. 4,845,506 does not describe an array processing system able to analyze radar signal energy received simultaneously from arbitrary azimuth directions.

DE 3885397 describes an antenna array that generates two fixed lobes pointing in different azimuth directions. The antenna array is used in a radar system to determine longitudinal velocity of a vehicle. The two directions are fixed directions, and the processing circuitry described in DE 3885397 is not able to exploit more dynamic angle of arrival signal processing to identify suitable received radar signal component for determining a two-dimensional velocity vector of a vehicle.

U.S. Pat. No. 3,363,253 describes a four-beam antenna with fixed direction beams that can be used for ground speed determination. The system is not set up to separate radar signal components received via the same antenna array from each other based on the respective angles of arrival.

EP0095300 describes a vehicle mounted Doppler radar system which comprises a fixed-beam antenna system in Janus configuration. The beams are directed such that the impact of vehicle vibration is minimized. There is no dynamic angle of arrival signal processing in the system of EP0095300, i.e., the system uses fixed beams for transmission and for reception of radar signal energy, instead of detecting different simultaneously received radar signal components of the received radar signal, and separating them from each other, based on their respective angle of arrival.

DE19720846 discloses a system for measuring the speed of a vehicle using a ground speed radar system. The system comprises a fixed beam antenna in Janus configuration, and is not able to separate radar signal components received simultaneously by the same antenna array based on the respective angles of arrival.

Another problem that is encountered when controlling motion by a heavy-duty vehicle 100 by a plurality of actuators arranged on different wheels 102 on the vehicle 100, is that the peak wheel force, i.e., the product of the friction coefficient μ of the road surface 101 and the normal force $F_z$ is not known. I.e., the approximate wheel slip $\lambda_x$ giving maximum longitudinal wheel force $F_x$ may be known, and the wheel slip limit for ensuring that some degree of lateral wheel force can be generated may also be known, but the resulting wheel force magnitude is not since y and/or $F_z$ may be unknown, and hence the product $\mu F_z$ cannot be approximated, even if $F_z$ can be preconfigured as a fixed value in some cases. The normal force $F_z$ may in some cases be inferred from the suspension system of the vehicle 100, e.g., based on measurement of bellow pressure or vertical displacement of the vehicle chassis relative to ground since the suspension system is compressed in dependence of the weight of the vehicle. The friction coefficient μ of the road surface 101 is more difficult to determine in a reliable manner. Some advanced optical systems for road friction estimation are known, but these are normally associated with prohibitive complexity, size and cost, preventing their use in high volume production vehicles. The techniques disclosed herein build on previous work where polarized high carrier frequency radar signals has been used for estimating the road surface characteristics, from which the friction coefficient can be determined at least approximately.

In "Road Surface Recognition at mm-Wavelengths Using a Polarimetric Radar", IEEE TRANSACTIONS ON INTELLIGENT TRANSPORTATION SYSTEMS, VOL. 23, NO. 7, JULY 2022, Vessen Vassilev describes a system that uses a polarimetric radar to estimate road surface conditions. This system can, e.g., be used to detect when a thin layer of ice has formed on the road surface. The system can also be used to detect when the road surface is wet, and when it is dry, at least in some cases. The disclosure also cites a number of references to similar work that can be applied together with the teachings herein. This technique is compatible with the radar transceivers discussed herein for use in determining speed over ground.

U.S. Pat. No. 5,621,413 also describes a system for classification of the road surface characteristics based on radar signals that comprise a first polarization component and a second polarization component different from the first polarization component. U.S. Pat. No. 5,621,413 uses a radar transmitter and a radar receiver that is spatially separated from the radar transmitter to characterize the road surface, which may be a disadvantage if a wheel end module is desired that can be mounted conveniently in connection to a specific wheel on the heavy-duty vehicle 100.

It is appreciated that the known systems for determining road surface characteristics such as road friction coefficient can sometimes be calibrated sufficiently well to provide the actual friction coefficient μ. However, the known systems more commonly just provide a parameter related to the friction coefficient μ of the surface 101. This parameter may, e.g., be a binary value ranging from "high" to "low", or a discrete value on a scale from, e.g., one to ten, where one is low friction and ten is high friction. The wheel force generating capability is then also given in approximate terms, such as "high" wheel force generating capability, "nominal" wheel force generating capability, and "low" wheel force generating capability. The wheel force generating capability may also be given on a scale of, say, one to ten, where one is low wheel force generating capability and ten is representative of high wheel force generating capability. The exact formatting and resolution of the parameter related to the friction coefficient μ of the surface 101 and its use will differ between implementations.

Radar systems for determining road surface characteristics are known in the art. However, efficient ways to incorporate this type of sensing technology into heavy-duty vehicles are lacking in the prior art. The present disclosure seeks to combine ground speed radar technology with road surface characterization technology into a wheel end module 140 which is able to provide reliable data on vehicle or wheel speed over ground, wheel slip, and also wheel force generating capability. Example wheel end modules 140 are illustrated in FIG. 1, where it is noted that they are arranged on connection to respective wheels or wheel axles to determine road surface friction characteristics.

Parts of the present disclosure relates to a wheel end module 140 for a heavy-duty vehicle 100, as exemplified in FIG. 1. The wheel end module 140 comprises a general processing device 440, 700 for performing computations and processing of sensor data, which will be discussed in more detail below. The techniques disclosed herein comprise determination of various parameters and properties of the vehicle, such as its motion state and capabilities in terms of force generation, and also of the environment, such as the road friction. These parameters may be either continuous or discrete parameters. The parameters may correspond to actual physical quantities like friction coefficients and forces in Newtons or be some scaled version thereof. The parameters may also be proprietary representations of the physical quantities. A parameter may for instance be a discrete set of values ranging from "low" to "high", and the various vehicle functions may be set up to adjust their operation in dependence of the parameter. A wheel force allocation module may for instance be configured to back off the allocated wheel forces in case the wheel force generating capability is determined as being below a nominal value, and allocate more force than normal in case the wheel force generating capability is determined as being above the nominal value.

The wheel end module 140 also comprises a load sensing arrangement and a dual polarized radar module 110 arranged to transmit a radar signal 115 towards the surface 101 supporting the vehicle 100 and to receive backscatter from the radar signal 115. The radar module 110 may be selected from any of the prior art radar modules configured to determine road friction mentioned above. A dual polarized radar module is any radar module comprising a dual polarized radar transceiver able to transmit and receive radar signals at two different, preferably orthogonal, polarizations.

The processing device 440, 700 of the wheel end module 140 is arranged to determine a parameter related to a normal force $F_z$ associated with at least one wheel 102, 310 of the heavy-duty vehicle 100 by the load sensing arrangement, and also to determine a parameter related to a friction coefficient $\mu$ of the surface 101 by the radar module 110.

The normal force related parameter may be determined as a continuous parameter or as a discrete parameter ranging over a number of steps from "low" to "high" normal force. The normal force related parameter may also be a value given in Newtons.

The friction coefficient related parameter may also be determined as a continuous parameter or as a discrete parameter ranging over a number of steps from "low" to "high" friction. The friction coefficient related parameter may also be a value that corresponds to an actual friction coefficient.

The load sensing arrangement may comprise a suspension displacement sensor and/or a suspension bellow pressure sensor arranged in connection to the at least one wheel 102, 310. The processing device 440, 700 can then be arranged to determine the normal force $F_z$ related parameter based on a predetermined relation between normal force $F_z$ and suspension displacement and/or suspension bellow pressure. The predetermined relation may, e.g., be stored in the form of a look-up-table (LUT) or a function which allows translation between suspension state and normal force $F_z$. The LUT or function can be determined by practical experimentation or by computer simulation, or a combination of the two. Some methods for estimating normal force based on vehicle behavior (measured, e.g., by an inertial measurement unit) are also known which can be applied here.

The radar module 110 can be arranged to determine a distance d to the surface 101 in connection to the at least one wheel 102, 310, as illustrated in FIG. 1, based on the radar signal 115. The processing device 440, 700 can then be arranged to determine the normal force $F_z$ related parameter based on the distance d to the surface 101 and on a predetermined relation between normal force $F_z$ and distance d to the surface 101. This predetermined relation may also be stored in the form of a look-up-table (LUT) or a function which allows translation between the distance d to the surface 101 and normal force $F_z$. The LUT or function can be determined by practical experimentation or by computer simulation, or a combination of the two. The distance d to the surface can be measured perpendicular to the surface as illustrated in FIG. 1, or at an angle relative to the surface 101.

The processing device 440, 700 of the wheel end module 140 is arranged to determine a wheel force generating capability, either longitudinal $F_x$ or lateral $F_y$ of the at least one wheel 102, 310, based on the normal force $F_Z$ related parameter and on the friction coefficient $\mu$ related parameter, e.g., by multiplying the two parameters as discussed above in connection to FIG. 2, or by using a predetermined relation between normal force $F_z$ related parameter and friction coefficient $\mu$ related parameter on one hand and wheel force generating capability on the other hand.

The wheel force generating capability may generally be determined as a continuous value or as a discrete parameter ranging over a number of steps from "low" to "high" wheel force generating capability. The wheel force generating capability may also be a value given in Newtons. The wheel force generating capability can for instance be determined from a preconfigured matrix that is indexed by the friction coefficient related parameter and by the normal force related parameter. The wheel force generating capability can also be determined based on a predetermined function of the friction coefficient related parameter and the normal force related parameter.

The processing device 440, 700 may also be arranged to determine the normal force $F_z$ related parameter as a preconfigured default value, e.g., as a fixed parameter configured in dependence of vehicle type. This will of course result in some decrease in accuracy in the determined wheel force generating capability, but the wheel end module still provides valuable input to, e.g., the VMM function 360 on the heavy-duty vehicle 100, even if the determined wheel force generating capability has lower precision.

The wheel end module 140 is furthermore arranged to output the wheel force generating capability $F_x$, $F_y$ on an output interface of the wheel end module 140. This wheel force generating capability can then be used for vehicle motion management, in particular when allocating wheel force requests between different actuators on the heavy-duty vehicle (100), as will be discussed below in connection to FIG. 5.

The wheel end modules 140 discussed herein are generally devices that are mountable in connection to a wheel 102 on a heavy-duty vehicle 100, or in connection to a wheel axle, although some wheel end modules may also be distributed over the vehicle 100 to cover more than one wheel or wheel axle. The wheel end modules may comprise a radar module 110 configured to determine a velocity of the heavy-duty vehicle 100 with respect to a surface 101 supporting the vehicle 100, and also a parameter related to a friction coefficient μ of the surface 101, as discussed above. The radar module comprises a radar transceiver arranged to transmit a radar signal 115 by a transmitter and to receive backscatter from the transmitted radar signal by a radar receiver co-located with the transmitter, where the radar signal 115 comprises a first polarization component and a second polarization component different from the first polarization component. The radar module 110 also comprises a processing device 440 arranged to determine at least one radial velocity $V_r$ (defined as a velocity towards or away from the radar transceiver) based on the received radar signal 115 and to determine the velocity of the heavy-duty vehicle 100 based on the at least one radial velocity $v_r$. The processing device 440 is also arranged to determine the parameter related to the friction coefficient μ of the surface 101 based on the received radar signal 115. The wheel end module furthermore comprises a load sensing arrangement configured to determine a normal force $F_z$ associated with the heavy-duty vehicle 100, and a wheel speed sensor. This allows the wheel end module to output not only the speed over ground of the associated wheel or wheel axle to upper layer functions like the VMM system 360, but also a wheel slip $\lambda_x$ and/or slip angle α since the wheel speed is known at the wheel end module. The wheel end module also has access to data indicative of the wheel force generating capability of the wheel, since both the friction coefficient μ of the surface 101 is known (at least approximately), and the normal force $F_z$, which allows determination of the wheel force limit $\mu F_z$ discussed above in connection to FIG. 2. The relationship between wheel slip $\lambda_x$ and generated wheel force wheel slip $F_x$, the lateral force generation capability, as well as the force generation capability $\mu F_z$ are all available at the wheel end module.

An upper layer VMM system, as will be discussed in more detail below in connection to FIG. 5, may receive the data from one or more wheel end modules 140 like this, and perform advanced vehicle motion management functions based on the received data. One particular benefit of the herein disclosed wheel end modules is that an MSD coordination function can be realized which allocates wheel forces according to wheel force generating capability, as reported from the wheel end modules.

The radar transceivers discussed herein may illuminate a small portion of the road surface or a larger portion, as illustrated in the inserted illustrations at the bottom of FIG. 1. Various illumination patterns can be selected (both smaller area and larger area), but it is an advantage if the illuminated portion of the ground surface by a given radar transceiver is close to a wheel and relatively small in size since this improves the received signal power of the radar signal components. For friction estimation it is preferred to place the illuminated area in front of a wheel, since then a change in friction can be reacted to before the wheel encounters the road surface where the change in friction was detected. As shown in FIG. 1, the illuminated portion of surface 101 can be a relatively small region 130*a* in front of the contact patch of a wheel 102, or a larger region 130*b* in front of an axle. By illuminating a smaller region more specific road surface characterization can be performed, while the larger surface provides some spatial averaging that suppresses variations over the road surface. The illuminated portion of surface is preferably within 1 m of the contact patch of a wheel or an axle, since this allows a better idea of how the wheel is moving relative to the road surface.

The radar transceiver is arranged to transmit a radar signal over a radar bandwidth, where a larger bandwidth improves range resolution in a known manner. Velocity resolution depends on the radar wavelength and the repetition period of the waveform in a known manner. According to some aspects, the transceiver is arranged to transmit a frequency modulated continuous wave (FMCW) radar signal over the radar bandwidth, where a frequency chirp is swept over the radar bandwidth in cycles. Other types of radar signal formats may also be used, such as band-spread radar signals where orthogonal codes are used to spread a modulated signal over a wide frequency band, or an orthogonal frequency division multiplexed (OFDM) radar signal. Given an FMCW radar signal format, the distance to the surface 101 (and also to reflecting material under the road surface) may be determined based on a first Discrete Fourier Transform (DFT), or Fast Fourier Transform (FFT), and the radial velocity $V_r$ or Doppler frequency of the illuminated portion of ground may be determined based on a second DFT or FFT, in a known manner. The result of applying a range FFT and a Doppler FFT is often denoted a range-Doppler map or R-D map for short. A range-Doppler map is a matrix of complex values, where each column index corresponds to backscatter energy received at a given radar antenna from reflections at a given range, and where each row index corresponds to radar backscatter energy received at a given radar antenna from reflections at a given radial velocity $v_r$ relative to the position of the radar transceiver. A good overview of rudimentary FMCW radar processing is given in the lecture notes "Introduction to mmwave Sensing: FMCW Radars" by Sandeep Rao, Texas Instruments, 2017. The Doppler frequency at the range corresponding to the distance between the radar transceiver and ground is indicative of the radial speed at which the ground moves relative to the radar transceiver, as explained in US 2004/0138802.

The antenna array comprised in the radar module 110 is optionally configured to emit the radar signal 115 in a first azimuth direction d1 and in a second azimuth direction d2 different from the first azimuth direction. This means that the radar signal illuminates the surface 101 in at least two directions. This can be done by illuminating a larger area of the road surface by a relatively broad antenna beam, or by illuminating two or more separate sections of the surface or road surface 101 by a plurality of more narrow beams, or by a beam arranged to be swept over a range of different azimuth angles. The radar system can be arranged to be mounted to the vehicle chassis, as shown in FIG. 1, such that both the first azimuth direction and the second azimuth direction point towards the ground, but in different azimuth directions. If the radar transceiver illuminates the road surface in at least two different azimuth directions, then it is able to receive backscattered radar signals from two or more different azimuth directions. This can be exploited by array signal processing at the radar system in order to determine vehicle velocity in more than one dimension, i.e., in longitudinal and lateral directions, relative to the vehicle or relative to a wheel on the vehicle, including both steered and non-steered wheels, using a single radar transceiver instead of two or more radar transceivers as proposed in, e.g., US 2004/0138802.

It is appreciated that a pitch motion of the vehicle 100 will have an impact on the radial velocity $V_r$ determined by forward and rearward looking radars, and that a roll motion by the vehicle 100 will impact laterally facing radar transceivers. This is because roll motion and pitch motion by the vehicle will move the radar transceivers closer and further away from the ground, which relative motion will appear in the determined radial velocity as a velocity by the radar transceiver relative to the ground. Significant pitch and roll motions by the vehicle, which may occur during hard braking and steering, will negatively impact accuracy of longitudinal and lateral velocity determined by the type of radar systems discussed herein, unless compensated for. However, in most cases of interest the impact from vehicle pitch and roll motion is not significant. The statements made in US 2004/0138802 regarding the need for more than two radar antenna lobes to determine vehicle longitudinal and lateral velocity are therefore not entirely correct, unless particularly strict requirements on accuracy are placed on the system. It is indeed possible to obtain sufficiently accurate speed over ground measurements using only two antenna lobes directed in a first azimuth direction and in a second azimuth direction different from the first azimuth direction. Further to this, it is appreciated that additional motion sensors such as inertial measurement units (IMU) and wheel speed sensors can be used as complement to the radar sensors in order to obtain a robust vehicle speed determination system.

Suppose that a radial velocity $v_r$ is measured using a radar module with a narrow transmission main lobe pointing at an azimuth angle α relative to a longitudinal direction of the vehicle 100. This radial velocity $V_r$ can then be projected onto longitudinal and lateral velocity components to obtain a straight-forward estimate of vehicle two-dimensional velocity as $$v_x = v_r \cos(\alpha)$$

$$v_y = v_r \sin(\alpha)$$

Hence, in fact, only one radar measurement is necessary for a basic speed estimation. It is, however, appreciated that the radar cannot measure velocity perpendicular to the bore-sight direction, as such velocity does not give rise to any radial velocity. Thus, the estimator is preferably complemented by at least one more radar transmission beam at angle β relative to the longitudinal direction of the vehicle 100. This additional radial velocity measurement will pick up velocity components orthogonal to the boresight direction of the first measurement, and vice versa. Practical experimentation using a ground speed radar system of this kind on a heavy-duty vehicle has indeed indicated that this is a feasible approach to determining the speed of a heavy-duty vehicle in many if not all driving scenarios.

The radar module 110 optionally comprises a processing device arranged to detect first and second radar signal components of the received radar signal 115 based on their respective angle of arrival (AoA) according to the techniques discussed above, where the first radar signal component has an AoA corresponding to the first azimuth direction d1 and the second radar signal component 430 has an AoA corresponding to the second azimuth direction d2. In other words, processing device 440 analyzes the received radar signal, which comprises a plurality of simultaneously received radar signal components, with respect to angle of arrival, and identifies at least the first and second radar signal components based on their respective AoA.

An antenna array is a device comprising a plurality of antenna elements. Each pair of transmit antenna and receive antenna in the array gives rise to a respective range-Doppler map, indicating received radar signal energy at different distances and radial velocities. Each range-Doppler map cell comprises a complex value associated with a phase and a magnitude, in a known manner. A complex-valued vector of signal values corresponding to a given range and Doppler can be obtained by extracting corresponding values from the R-D map of each antenna pair. The array may comprise multiple antenna elements that are spaced uniformly such as on the order of a half-lambda. Some previously known radar systems use multiple transmission antennas either sequentially or simultaneously in time to create a virtual aperture sometimes referred to as a Synthetic Aperture Radar (SAR), that is larger than the physical array. The net effect is a relatively small number of real or virtual antenna elements and a relatively small physical aperture. The angle of arrival of an incoming radar reflection can be determined conveniently by a third FFT—the angle FFT, applied to range-Doppler cells from each range-Doppler map generated by each transmit-antenna pair in the radar sensor array, after appropriate zero-padding. The determination of target angle using an FFT may for instance be realized using the Bartlett algorithm. The Bartlett algorithm is generally known and will therefore not be discussed in more detail herein. In case the antenna element spacing is non-uniform, a zero-padding of the complex-valued vector may be needed prior to the FFT operation. Using this technique for angle-of-arrival processing, the processing device of the radar module can analyze a received radar signal in terms of angle of arrival, and detect first and second radar signal components of the received radar signal based on their respective angle of arrival. Thus, it does not matter in which direction the radar signal was transmitted, or if the radar signal was transmitted in a wide lobe or in one or more narrow lobes, since the processing device will identify radar signal components based on their angles of arrival, and from there determine the two-dimensional velocity vector $[v_x, v_y]$ of the heavy-duty vehicle based on respective Doppler frequencies of the first and of the second detected radar signal component.

Figure 6:
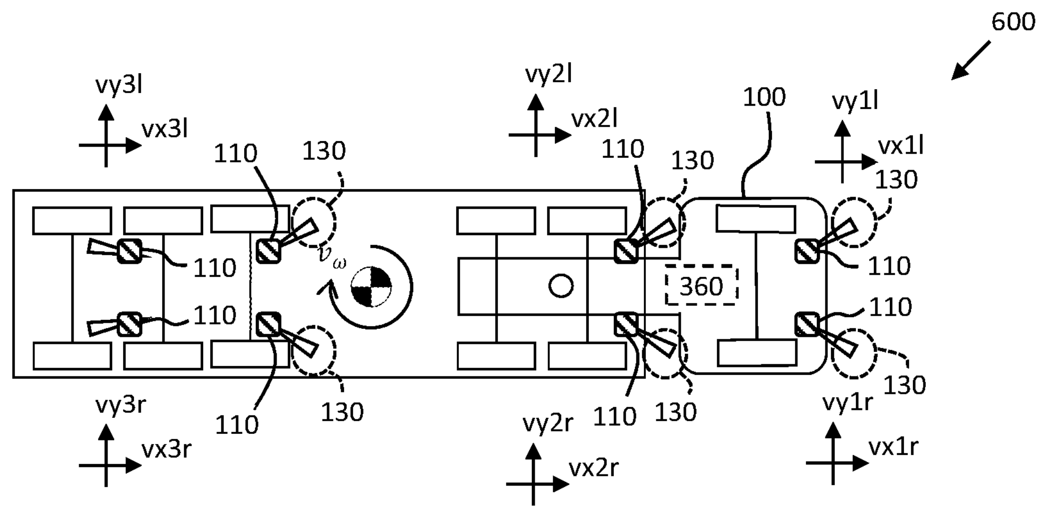
FIG. 6 illustrates an example heavy-duty vehicle.

Thus, to summarize, some of the example radar transceivers described herein illuminate one or more portions 130 of the road surface under the vehicle as illustrated in FIG. 6, either smaller portions 130*a* or larger portions 130*b* as shown in FIG. 1, and receives backscattered energy from the road surface from at least two different azimuth directions. The use of an antenna array allows the processing device to perform AoA signal processing to separate backscattered radar signal energy which arrives from different directions, thereby allowing the radar module to identify two or more radar signal components arriving from different azimuth directions. The radial velocity of the road surface in the two different directions will be indicative of the velocity of the vehicle in two dimensions, or even in three dimensions in case a more advanced antenna array is used, such as a two-dimensional antenna array. A radar transceiver with capability of separating radar backscatter received from different directions will also be capable of determining road characteristics in different regions on the road, such as in front of two or more wheels of the vehicle, or along an estimated trajectory of a wheel.

FIGS. 4A and 4B illustrate two example antenna arrangements 400, 450. The antenna array 400 in FIG. 4A comprises a plurality of antenna elements 410 arranged on a line, and is therefore able to both emit and receive signals from different directions in a plane, essentially forming antenna lobes in the different directions (at least for receiving backscattered radar signal). The antenna array can for instance be arranged to emit and/or to receive radar signals in different azimuth directions relative to the position of the radar transceiver. FIG. 4C shows an example antenna diagram of how antenna gain (after array signal processing), may vary over azimuth angle. This particular example antenna array has been configured to emit radar energy in a first azimuth direction d1 which coincides with a longitudinal direction of the vehicle 100, and in a second azimuth direction d2 which coincides with a lateral direction of the vehicle. Thus, radial motion in the first azimuth direction is indicative of longitudinal velocity of the vehicle while radial motion in the second azimuth direction is indicative of vehicle velocity in the lateral direction of the vehicle. Road surface characteristics, such as the parameter related to the friction coefficient μ of the surface 101 discussed above, can also be determined for a road surface region in the first azimuth direction and in the second azimuth direction. Hence, given an antenna array implementation, each radar transceiver may be arranged to output more than one friction coefficient related parameter, e.g., as a vector or function indexed by azimuth angle.

The antenna array 450 schematically illustrated in FIG. 4B comprises a plurality of antenna elements 410 arranged on a two-dimensional grid (seen from in front of the array). Radar signal energy emitted via this antenna array can be steered in both azimuth and elevation dimensions, allowing the antenna array to focus radar signal energy with additional degrees of freedom compared to the array 400 in FIG. 4A. Antenna lobes can also be focused or made more broad by configuration of the antenna array, using known beamforming techniques. This allows more freedom in steering the radar system to determine radial velocity in more than one elevation and azimuth angle, and also to determine road surface characteristics such as road friction in more than one elevation and azimuth angle, as well as over road surface regions of different size.

The antenna array 400, 450 of the radar module 110 can be configured to emit the radar signal 115 over a range A of different azimuth directions which comprises at least the first azimuth direction d1 and the second azimuth direction d2. A portion of the road surface 101 in vicinity of the radar module 110 is thus illuminated by radar signal energy, and a part of this radar signal energy is reflected back towards the antenna array. A set of discrete azimuth directions may also constitute the range A of azimuth directions, i.e., the processing device 440 can be arranged to evaluate the received radar signal power in a number of discrete azimuth directions which cover the range A of azimuth directions. Steered receive lobe beamforming can be used to optimize received signal power by adjusting the direction of the receive lobe to maximize received signal power. In both cases the antenna array of the radar module 110 is used to monitor incoming radar signal energy from different azimuth directions, and optionally also from different elevation directions, detect radar signal components that can be used for ground speed determination and for estimation of road friction in different regions on the road surface 101.

The actual azimuth direction of arrival of a radar signal component corresponding to a given antenna array beam steering configuration may be obtained from calibration. Both on-line and off-line calibration can be used. An off-line calibration may, e.g., comprise a look-up table where beam steering vectors can be translated into azimuth angle of arrival. On-line calibration may comprise detecting that the vehicle is moving in a straight line (no applied steering), with little or no applied wheel force, in which case the vehicle speed over ground should only comprise longitudinal speed and no lateral speed. Hence, a detected radial velocity can be related to a vehicle speed over ground direction. Wheel speeds can be used to calibrate radial velocity magnitude. Calibration of radar systems such as the ones discussed herein are generally known and will therefore not be discussed in more detail herein.

FIG. 3 schematically illustrates functionality 300 for controlling an example wheel 310 on the vehicle 100 by some example MSDs here comprising a friction brake 320 (such as a disc brake or a drum brake), a propulsion device 340 and a power steering arrangement 330. The friction brake 320 and the propulsion device are examples of wheel torque generating devices, which can be controlled by one or more motion support device control units 330. The control is based on, e.g., measurement data obtained from a wheel speed sensor 350 and from other vehicle state sensors, such as radar sensors, lidar sensors, and also vision based sensors such as camera sensors and infra-red detectors. An MSD control unit 330 may be arranged to control one or more actuators. For instance, it is common that an MSD control unit 330 is arranged to control both wheels on an axle.

The traffic situation management (TSM) function 370 plans driving operation with a time horizon of 10 seconds or so. This time frame corresponds to, e.g., the time it takes for the vehicle 100 to negotiate a curve or the like. The vehicle maneuvers, planned and executed by the TSM system, can be associated with acceleration profiles and curvature profiles which describe a desired target vehicle velocity in the vehicle forward direction and turning to be maintained for a given maneuver. The TSM system continuously requests the desired acceleration profiles $a_{req}$ and steering angles (or curvature profiles $c_{req}$) from the VMM system 360 which performs force allocation to meet the requests from the TSM system in a safe and robust manner. The VMM system 360 operates on a timescale of below one second or so and will be discussed in more detail below.

The wheel 310 has a longitudinal velocity component $v_x$ and a lateral velocity component $v_y$ (in the coordinate system of the wheel or in the coordinate system of the vehicle, depending on implementation). There is a longitudinal wheel force $F_x$ and a lateral wheel force $F_y$, and also a normal force $F_z$ acting on the wheel (not shown in FIG. 3). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $\omega_i$, and a radius R. The wheel contact patch on the surface 1201 supporting the wheel 310 is associated with a friction coefficient μ.

A vehicle speed sensor 380 based on the herein disclosed radar systems is used to determine vehicle speed over ground, which can then be translated into wheel speed components $v_x$ and/or $v_y$, in the coordinate system of the wheel. This means that the wheel steering angle δ is taken into account if the wheel is a steered wheel, while a non-steered wheel has a longitudinal velocity component which is the same as the vehicle unit to which the wheel is attached.

A road friction sensor 385 that is based on the herein disclosed dual polarized radar systems is used to determine road friction conditions, at least approximately. This data is then forwarded to the MSD control unit 330 and/or to the VMM system 360. The present disclosure describes a radar module 110 that can be used as road friction sensor 385 and also as vehicle speed sensor 380, sharing the same radar front end and antenna system, which is an advantage. The radar module 110 can be configured to determine a velocity $v_x$, $v_y$ of the heavy-duty vehicle 100 with respect to a surface 101 supporting the vehicle 100 and also a parameter related to a friction coefficient μ of the surface 101 as discussed above. The radar module comprises a radar transceiver arranged to transmit a radar signal 115 by a transmitter and to receive backscatter from the transmitted radar signal by a radar receiver that is preferably but not necessarily co-located or even integrally formed with the transmitter, e.g., sharing the same physical antenna. The radar signal 115 comprises a first polarization component and a second polarization component different from the first polarization component. The two polarization components may be orthogonal to each other, such as a horizontal and a vertical polarization component, although this is not a requirement. Circular polarization is also a possibility. In electrodynamics, circular polarization of an electromagnetic wave is a polarization state in which, at each point, the electromagnetic field of the wave has a constant magnitude and is rotating at a constant rate in a plane perpendicular to the direction of the wave.

The radar module 110 comprises a processing device 440 arranged to determine at least one radial velocity based on the received radar signal 115 and to determine the velocity $v_x$, $v_y$ of the heavy-duty vehicle 100 based on the at least one radial velocity. The processing device 440 is also arranged to determine the parameter related to the friction coefficient μ of the surface 101 based on the same received radar signal 115. Thus, a single radar transmission is used to determine both speed over ground and road surface friction characteristics, which is an advantage. The combination of features enable the radar module to output data from which wheel slip can be determined and also the wheel force generating capability, given wheel speed data and normal force, which may be available at higher layer functions, or even at the radar module. The radar transceiver preferably comprises an antenna array 400, 450 configured to emit the radar signal 115 over a range A of azimuth directions as discussed above in connection to FIGS. 4A and 4B. In this case the processing device 440 can be arranged to determine the parameter related to the friction coefficient μ of the surface 101 for at least two different azimuth directions at the same time or sequentially, which is an advantage. Some radar modules may be arranged to scan the road surface in front of the vehicle, or in front of a wheel, in order to detect upcoming changes in road friction. To give an example, suppose the vehicle 100 is travelling with a longitudinal speed of about 80 km/h, which is about 22 m/s. Suppose further that the radar module scans an azimuth range A of about 120 degrees (centered on the vehicle longitudinal direction) every 5 ms. This means that the vehicle moves about 10 cm or so for each scan. If the monitored road surface area is about 1 m ahead of a given wheel, or about 1 m in front of the vehicle, then an upper layer TSM system 370 and/or an upper layer VMM system 360 has about 50 ms to react to a detected change in friction conditions, which is normally enough for at least some actuators, like electric machines. The time period for reaction is of course prolonged if the monitored road surface area is further ahead of the wheel or vehicle, such as 5 m or so ahead of the wheel or vehicle.

A set of discrete azimuth directions or a continuous range of azimuth directions may constitute the range A of azimuth directions that the radar module is capable of observing speed and road surface friction in. The antenna array 400, 450 can be configured to emit the radar signal 115 in a transmission lobe simultaneously covering the range A of azimuth directions or in a transmission lobe which is more narrow than the range A of azimuth directions. In case of a narrow transmission lobe, the transmission can be swept over the range A of azimuth directions. The antenna array 400, 450 is optionally also configured to emit the radar signal 115 in a transmission lobe simultaneously or sequentially covering a range E of elevation directions. This allows even more freedom in adapting the region of road surface where friction is monitored.

According to some aspects, the radar module 110 comprises a thermometer arranged to determine an ambient temperature of the radar module 110. This temperature may be used to validate the friction data obtained from the radar transceiver system. For instance, an allowed range of friction may be predetermined based on temperature, since slippery surfaces like ice and snow cannot form in high temperatures. Also, very cold temperatures rarely result in very slippery road conditions. Upper and lower limits on estimated friction can be defined as function of ambient temperature, and used in the determination of the parameter related to the friction coefficient. These upper and lower limits can be determined by practical experimentation in field trials. The radar module 110 may also comprise an infrared detector arranged to determine a temperature of the road surface 101. This road surface temperature can be used to validate the parameter related to the friction coefficient, and also as input to more advanced road friction estimation algorithms that are based on both radar data and road surface temperature data.

For instance, a machine learning structure, such as a neural network or a random forest structure, can be trained using datasets of radar data and road surface temperature data collected from different road surfaces at different temperatures and friction coefficients. The machine learning structure can then be trained on the data to estimate the parameter related to the friction coefficient based on both road surface temperature and radar data according to the above cited literature related to determining road surface friction characteristics.

For example, several different data sets can be collected of radar signals comprising a first polarization component and a second polarization component different from the first polarization component, where each data set is collected for a road surface having known friction coefficient, or at least approximately known friction coefficient. Each data set also comprises road surface temperature from an infrared detector and/or ambient temperature provided by a temperature. A machine learning structure can then be trained using techniques known in the art until it is able to predict road friction condition from radar data complemented by temperature data. The training can be considered to have converged when the machine learning algorithm is able to differentiate low friction conditions from high friction conditions, or when the machine learning algorithm is able to tell the difference between a road surface of one range of friction coefficient from a road surface of another friction coefficient with sufficiently high accuracy.

According to aspects of the present disclosure, there is disclosed a radar module 110 configured to determine a parameter related to a friction coefficient μ of a road surface 101. The radar module comprises a temperature sensor such as a thermometer and/or an infrared detector directed at the surface 101, and a radar transceiver arranged to transmit a dual polarized radar signal 115 by a transmitter towards the surface 101 and to receive backscatter from the transmitted radar signal by a radar receiver co-located or integrated with the transmitter. The radar signal 115 comprises a first polarization component and a second polarization component different from the first polarization component. The radar module 110 comprises a processing device 440, 700 arranged to determine the parameter related to the friction coefficient μ of the surface 101 based on the received radar signal 115 and on data obtained from the temperature sensor, at least in part using a machine learning algorithm. This radar module 110 can be used as a stand-alone sensor or in combination with one or more other sensor techniques discussed herein.

The combination of wheel speed sensor 350, vehicle speed sensor 380, and road friction sensor 385 exemplified in FIG. 3 is advantageous since it allows the MSD control unit 330 and/or the VMM system 360 to determine wheel slip and wheel slip angle in a reliable manner, and also the road friction which gives an idea of the wheel force generating capability of one or more wheel son the vehicle 100. The type of inverse tyre models exemplified by the graph 200 in FIG. 2 can be used by the VMM 360 to generate a desired tyre force at some wheel, having regard to current road surface conditions and vehicle speed over ground. Instead of requesting a torque corresponding to the desired tyre force, the VMM can translate the desired tyre force into an equivalent wheel slip (or, equivalently, a wheel speed relative to a speed over ground) and request this slip instead. The main advantage being that the MSD control device 330 will be able to deliver the requested torque with much higher bandwidth by maintaining operation at the desired wheel slip, using the vehicle speed $v_x$ from the vehicle speed sensor 380 and the wheel rotational velocity $\omega_i$, obtained from the wheel speed sensor 350. The wheel force generating capability of a wheel or wheel axle is now known at least approximately to the system, since the road friction conditions are known from the road surface friction sensor 385 based on the ground radar systems described herein and in the above-mentioned prior art related to road friction estimation using dual polarized radar transceivers.

The control unit or units can be arranged to store one or more pre-determined inverse tyre models in memory, e.g., as look-up tables or parameterized functions. An inverse tyre model can also be arranged to be stored in the memory as a function of the current operating condition of the wheel 310. The force generating capability of a wheel or set of wheels can also be stored as function of the parameter related to the friction coefficient $\mu$ of the surface 101 determined by the radar module, potentially complemented by normal force data.

Particular advantages can be obtained if the radar systems discussed herein are integrated into a wheel end module, i.e., a highly integrated device mounted close to a wheel of the heavy-duty vehicle 100. A plurality of such wheel end modules can then be used to provide efficient vehicle motion management of a heavy-duty vehicle, as illustrated in FIG. 6, which shows an articulated heavy-duty vehicle that comprises a plurality of radar modules 110, where each radar module provides a two-dimensional speed over ground of the vehicle at its respective location. By central processing of the output data from the different radar modules, an accurate vehicle motion state can be determined, including yaw motion $v_w$. It is understood that particular advantages can be obtained if the radar module 110 is integrated into a wheel end module for a heavy-duty vehicle 100 which also comprises additional functions. The wheel end module comprises the radar module 110 according to the discussion above, and preferably also a wheel speed sensor 350 (or at least a high speed interface to an external wheel speed sensor) arranged to determine a rotational velocity $\omega_i$ of a wheel 310 on the heavy-duty vehicle 100. The processing device 440 (which may comprise more than one processing circuit, possibly distributed over the vehicle 100) is arranged to determine a wheel slip $\lambda$ and/or a slip angle $\alpha$ of the wheel 310 based on the rotational velocity $\omega_i$ of the wheel 310 and on the two-dimensional velocity vector $v_x$, $v_y$ of the heavy-duty vehicle 100. The wheel end module may also comprise an interface towards a suspension system of the vehicle 100, allowing it to determine the normal force $F_z$ at least approximately, which is an advantage since the peak force $\mu F_z$ can be determined and used for motion management of the heavy-duty vehicle 100. It is noted that the normal force $F_z$ can also be determined at least approximately based on a distance measured from a radar transceiver to the road surface, since this distance decreases with normal force $F_z$ from a nominal value as the vehicle is laden. A look-up-table (LUT) or function can be predetermined which maps distance to ground from a radar transceiver against normal force $F_z$.

To summarize, several examples of wheel end modules for a heavy-duty vehicle 100 are disclosed herein. Some of the example wheel end modules comprise a radar module 110 according to the discussed above, and a load sensing arrangement configured to determine a normal force $F_z$ associated with the heavy-duty vehicle 100. The load sensing arrangement may comprise, e.g., a suspension displacement or suspension bellow pressure sensor arrangement and a LUT or predetermined function that allows translation into normal force $F_z$ or at least into a parameter related to normal force $F_z$. The wheel end module optionally comprises a processing device 440 that is arranged to determine a distance to the surface 101 from one or more radar transceivers, based on the radar signal 115, where the load sensing arrangement comprises a predetermined relation between the distance to the surface 101 and the normal force $F_z$ associated with the heavy-duty vehicle 100.

The wheel end module preferably also comprises a wheel speed sensor 350 arranged to determine a rotational velocity $\omega_i$ of an i-th wheel 310 on the heavy-duty vehicle 100. In this case the processing device 440 can be arranged to determine a wheel slip $\lambda$ and/or a slip angle $\alpha$ of the i-th wheel 310 based on the rotational velocity $\omega_i$ of the wheel 310 and on the two-dimensional velocity vector $v_x$, $v_y$ of the heavy-duty vehicle 100.

The wheel end module may also comprise a control unit for controlling an electric machine 340, wherein the processing device 440 is arranged to control an axle speed of the electric machine 340 based on a target wheel slip k. This control unit then has information related to the wheel force generating capability of the wheel, allowing it to submit feedback to higher layer functions in case a wheel force request that cannot be fulfilled is obtained. Since the wheel end module is able to determine wheel slip in a stand-alone manner, it is also able to execute requests for wheel force directly (assuming it has access to an inverse tyre model as discussed above in connection to FIG. 2). However, the wheel end module will not be able to deliver wheel forces above the force limit $\mu F_z$ discussed above in connection to FIG. 2. Hence, if a request in violation of this limit is received, the wheel end module can respond to the request with a message indicating that the request cannot be accommodated given the current operating conditions. The wheel force generating capabilities can of course also be fed to higher layers such as the VMM system 360 and/or the TSM system 370 periodically or continuously.

Some of the example wheel end modules disclosed herein comprises an electric machine 340, or at least a control unit for controlling an electric machine. The processing device 440 can then be arranged to control an axle speed of the electric machine 340 based on a target wheel slip $\lambda$. This integrates both wheel slip determination and wheel slip control into a single wheel end module which can be mounted close to the wheel of a heavy-duty vehicle, where it can facilitate high bandwidth, i.e., rapid, wheel slip control. Further advantages are obtained of the wheel end module also comprises an inertial measurement unit (IMU), in which case the processing device 440 can be arranged to output one or more acceleration values to the central VMM system 360. This means that the VMM system 360 can obtain both accelerations, speeds over ground, and wheel slip from the wheel end module, allowing the VMM system close to full data about the current motion of the heavy-duty vehicle 100 in a dependable and cost efficient manner.

The radar module 110 can as explained above determine vehicle speed components in two dimensions by processing Doppler frequency of radar signal components received from first and second different directions, using the same radar signal, which is an advantage. Further advantages can, however, be obtained by arranging the processing device to detect the first and second radar signal components 420, 430 over respective distances exceeding a distance from the antenna array 400, 450 to the surface 101 along a bore sight direction of the antenna array, i.e., by configuring the radar transceiver as a ground penetrating radar transceiver.

The carrier frequency of the radar transceivers discussed herein is preferably in the GHz range, such as above 30 GHz and preferably around 80 GHz or so.

The reason for preferring this high carrier frequency is the small wavelength which allows scattering even from relatively smooth surfaces and/or homogenous materials. The small wavelength also improves the velocity resolution of the proposed techniques.

To improve accuracy further, the radar transceiver 1160 may be configured to receive data indicative of a vehicle height over ground, or a height over ground of the radar transceiver. This type of data may, e.g., be obtained from a linear position sensor configured in connection to the vehicle suspension, such as a suspension system sensor. Thus, as the vehicle moves up and down along a normal to the road surface, the detected Doppler frequency can be adjusted to account for the motion, which improves the estimated speed over ground in the longitudinal direction. The vehicle height over ground can also be used to infer normal force $F_z$ as mentioned above.

The processing device 440 is, according to some aspects, arranged to adjust a setting of the antenna array 400, 450 based on a pre-determined target AoA of the first and second radar signal components. This means that the processing device may calibrate the settings of the antenna array, i.e., the beamforming weights of the antenna array or its phase settings, in order to point the antenna lobes in the desired directions, such as the longitudinal and lateral directions of the vehicle 100. For example, the vehicle can be controlled to travel without sideslip in the longitudinal direction, and the processing device can then optimize the setting of the antenna array to maximize the radar signal power and the Doppler frequency in the first azimuth direction, and to maximize the radar signal power but minimize the Doppler frequency in the second azimuth direction. This essentially means that the processing device performs a beam steering operation involving the antenna array in order to focus antenna beams in desired directions. The antenna beams can also be directed at either side of a bore sight direction of the antenna array, in order to enable differential detection of lateral vehicle motion. In this case the processing device will perform beam steering to make the Doppler frequencies of the two radar signal components as equal as possible when the vehicle is driving in the longitudinal direction without sideslip or lateral motion.

Figure 5:
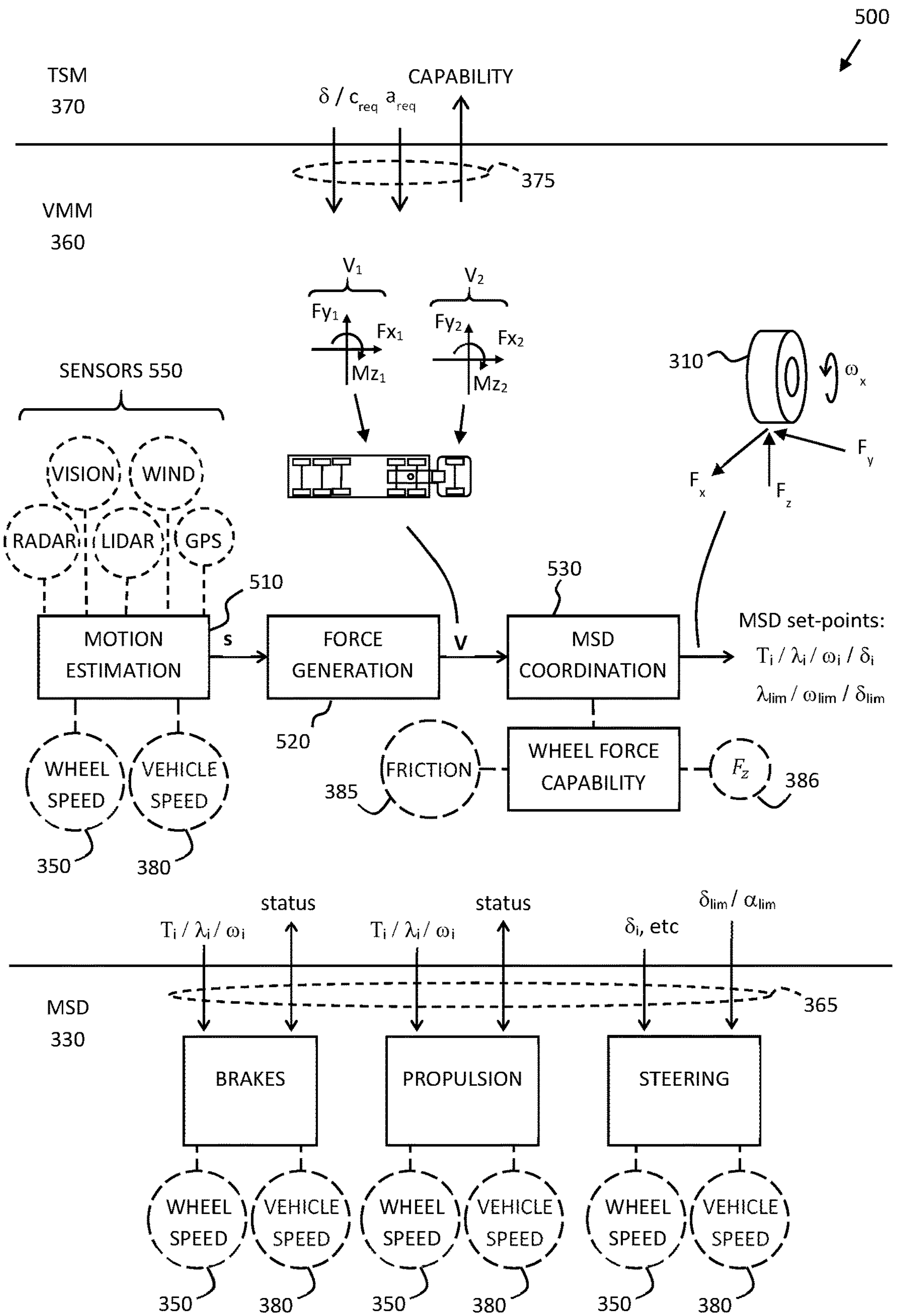
FIG. 5 illustrates an example vehicle control function architecture.

FIG. 5 illustrates an example vehicle control function architecture applicable with the herein disclosed methods, where the TSM system 370 generates vehicle motion requests 375, which may comprise a desired steering angle δ or an equivalent curvature $c_{req}$ to be followed by the vehicle, and which may also comprise desired vehicle unit accelerations areq and also other types of vehicle motion requests, which together describe a desired motion by the vehicle along a desired path at a desired velocity profile. It is understood that the motion requests can be used as base for determining or predicting a required amount of longitudinal and lateral forces which needs to be generated in order to successfully complete a maneuver.

The VMM system 360 operates with a time horizon of about 1 second or so, and continuously transforms the acceleration profiles $a_{req}$ and curvature profiles $c_{req}$ from the TSM system into control commands for controlling vehicle motion functions, actuated by the different MSDs of the vehicle 100 which report back capabilities to the VMM, which in turn are used as constraints in the vehicle control. These constraints may be determined based on the friction related parameters determined by the wheel end modules discussed herein, and also the force generating capabilities that can be output from some of the wheel end modules discussed herein. Generally, the constraints will be stricter in case of low friction, since then the wheel force generating capabilities will be more limited. The VMM system 360 performs vehicle state or motion estimation 510, i.e., the VMM system 360 continuously determines a vehicle state s comprising positions, speeds, accelerations, and articulation angles of the different units in the vehicle combination by monitoring operations using various sensors 550 arranged on the vehicle 100, often but not always in connection to the MSDs. An important input to the motion estimation 510 may of course be the signals from the vehicle speed sensor 380 and the wheel speed sensors 350 on the heavy duty vehicle 100, where the vehicle speed sensor 380 comprises a radar-based system as discussed herein.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$, and to behave according to the desired vehicle behavior. The required global force vector V is input to an MSD coordination function 530 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\delta_i$. The coordinated MSDs then together provide the desired lateral Fy and longitudinal Fx forces on the vehicle units, as well as the required moments Mz, to obtain the desired motion by the vehicle combination 100. An important part of the MSD coordination function 530 is that is receives at least friction estimation data from the one or more radar modules 110 on the heavy-duty vehicle 100, and possibly also normal force $F_z$ related to one or more wheels on the vehicle 100. This allows the MSD coordination function 530 to determine force generation capabilities of the different motion actuators on the heavy-duty vehicle 100, and allocate the force requests accordingly, such that no actuator receives a request that exceeds it capability. The wheel force generating capability of one or more wheels, determined, e.g., by the wheel end modules discussed herein, can be used as constraints in a mathematical optimization method executed by the MSD coordination function. Such optimization methods are known in the art and will therefore not be discussed in more detail herein. In case the global forces $V=[V_1, V_2]$ for the different vehicle units required to cause the vehicle 100 to move according to the requested acceleration and curvature profiles $a_{req}$, $c_{req}$ exceed the total force generating capability of the different actuators (as determined from the friction information and possibly also from the data related to normal force $F_z$), then a capability notification can be sent back to the TSM system 370. This capability function can be transmitted continuously, periodically, or on demand triggered by some event, such as a request that cannot be fulfilled by the actuators given the current operating conditions of the vehicle 100.

The MSD control units may obtain wheel speed from one or more wheel speed sensors 350, and also a reliable vehicle speed over ground 380 from the predictor antenna arrangements discussed above. One or more controllers may be connected to the predictor antenna arrangement.

Thus, according to some aspects of the present disclosure, the VMM system 360 manages both force generation and MSD coordination, i.e., it determines what forces that are required at the vehicle units in order to fulfil the requests from the TSM system 370, for instance to accelerate the vehicle according to a requested acceleration profile requested by TSM and/or to generate a certain curvature motion by the vehicle also requested by TSM. The forces may comprise e.g., yaw moments $M_z$, longitudinal forces $F_x$ and lateral forces $F_y$, as well as different types of torques to be applied at different wheels. The forces are determined such as to generate the vehicle behavior which is expected by the TSM system in response to the control inputs generated by the TSM system 370.

To summarize, there is disclosed herein a VMM system 360 for a heavy duty vehicle 100. The system comprises one or more radar modules 110 configured to determine a velocity $v_x$, $v_y$ of the heavy-duty vehicle 100 with respect to a surface 101 supporting the vehicle 100 and a parameter related to a friction coefficient $\mu$ of the surface 101. Each radar module 110 comprises a radar transceiver arranged to transmit a radar signal 115 by a transmitter and to receive backscatter from the transmitted radar signal by a radar receiver that is preferably co-located with the transmitter. The radar signal 115 comprises a first polarization component and a second polarization component different from the first polarization component. The radar module 110 also comprises a processing device 440 arranged to determine at least one radial velocity based on the received radar signal 115 and to determine the velocity $v_x$, $v_y$ of the heavy-duty vehicle 100 based on the at least one radial velocity. The processing device 440 is furthermore arranged to determine the parameter related to the friction coefficient $\mu$ of the surface 101 based on the received radar signal 115. The VMM system 360 also comprises an MSD coordination function 530 arranged to coordinate one or more MSDs of the heavy-duty vehicle 100 based on the one or more parameters related to friction coefficients $\mu$ determined by the one or more radar modules 110, as discussed above in connection to, e.g., FIG. 5.

According to some aspects, the VMM system is arranged to determine a wheel force generating capability of the heavy-duty vehicle 100 at least partly based on the one or more parameters related to friction coefficients $\mu$, and to output the wheel force generating capability to a TSM system 370 of the heavy-duty vehicle 100.

According to some further aspects, the VMM system is arranged to determine an operational design domain (ODD) of the heavy-duty vehicle 100 comprising a maximum longitudinal velocity $v_x$ and/or a maximum lateral velocity $v_y$ at least partly based on the one or more parameters related to friction coefficients $\mu$, and to output the ODD to the TSM system 370 of the heavy-duty vehicle 100. The ODD can for instance be determined from a preconfigured LUT indexed by the one or more parameters related to friction coefficients. It may be advantageous to also determine wheel force generating capability of one or more wheels on the vehicle and base the ODD determination on this wheel force generating capability. The ODD can also be determined based on a model of vehicle dynamics that takes the friction related parameter or parameters as input, or the wheel force generating capabilities of one or more wheels. Models of vehicle dynamics are well known in the art and will therefore not be discussed in more detail herein.

FIG. 6 illustrates an example heavy-duty vehicle 100 with a towing truck configured to tow a trailer unit in a known manner. The vehicle 100 comprises a system 600 of radar modules 110 distributed over the heavy-duty vehicle 100. This enables the VMM system 360 to determine relative vehicle motion of the different parts of the vehicle, and also a rotation, such as a yaw motion $v_\omega$. In other words, the VMM system 360 may be arranged to determine a yaw motion of the vehicle 100 based on the speed over ground of the vehicle 100 at the different radar modules 110. Wheel end modules, as discussed herein, can also be distributed over a heavy-duty vehicle 100 in this manner, allowing the VMM system 360 to obtain a detailed view of the motion of the vehicle, as well of the friction conditions on the road surface and thus also the force generating capability at the different wheels on the vehicle 100.

Figure 7:
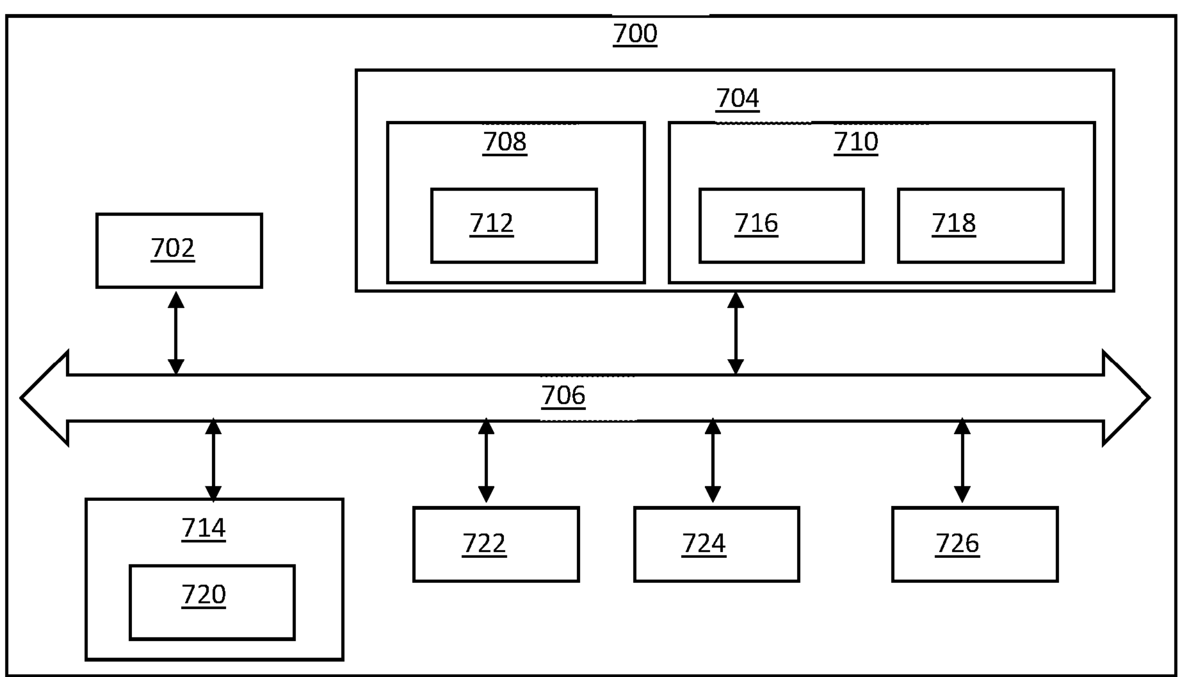
FIG. 7 schematically illustrates an example computer system.

FIG. 7 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, a control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include processing circuitry 702 (e.g., processing circuitry including one or more processor devices or control units), a memory 704, and a system bus 706. The computer system 700 may include at least one computing device having the processing circuitry 702. The system bus 706 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures, and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like. Computer-code which is hard or soft coded may be provided in the form of one or more modules. The module(s) can be implemented as software and/or hard coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 706 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

Figure 8:
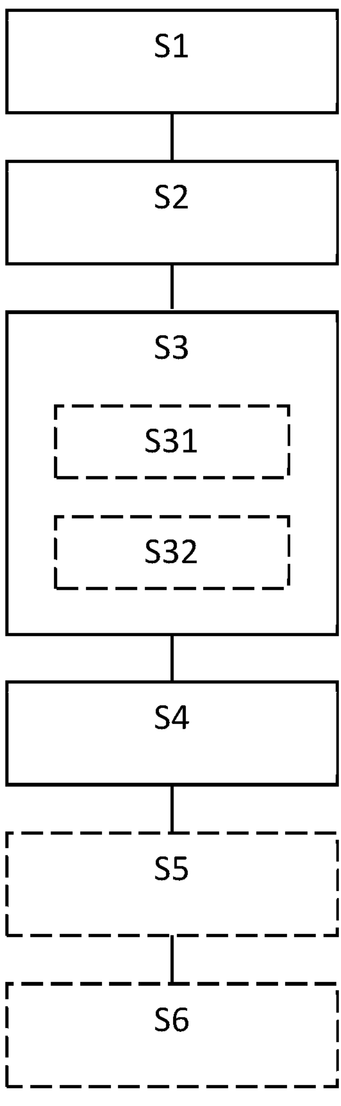
FIG. 8 is a flow chart illustrating a method.

FIG. 8 is a flow chart illustrating a method which summarizes some of the key concepts discussed above. There is illustrated a computer implemented method for determining a wheel force generating capability of at least one wheel 102, 310 on a heavy-duty vehicle 100 such as the vehicle 100 discussed above in connection to FIG. 1 and FIG. 6. The method comprises transmitting S1 a radar signal 115 by a radar transceiver towards a surface 101 supporting the vehicle 100, and receiving backscatter from the transmitted radar signal, where the radar signal 115 comprises a first polarization component and a second polarization component different from the first polarization component, processing S2 the received backscatter by a processing device 440, 700 to determine a parameter related to a friction coefficient $\mu$ of the surface 101, determining S3 a parameter related to a normal force $F_z$ associated with the at least one wheel 102, 310 of the heavy-duty vehicle 100 by a load sensing arrangement of the heavy-duty vehicle 100, and determining S4 the wheel force generating capability of the of at least one wheel 102, 310 based on the normal force $F_z$ related parameter and on the friction coefficient $\mu$ related parameter.

According to some aspects, the method comprises determining S31 the normal force $F_z$ related parameter based on a displacement, or a bellow pressure associated with a suspension of the heavy-duty vehicle 100.

According to some aspects, the method comprises determining S32 the normal force $F_z$ related parameter based on a distance d to the surface 101 determined based on the radar signal 115.

According to some aspects, the method comprises coordinating S5 one or more motion support devices, MSD, based on the friction coefficient μ related parameter.

According to some aspects, the method comprises determining S6 an operational design domain, ODD, of the heavy-duty vehicle 100 comprising a maximum longitudinal velocity $v_x$ and/or a maximum lateral velocity $v_y$ at least partly based on the friction coefficient μ related parameter.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A wheel end module for a heavy-duty vehicle, the wheel end module comprising a processing device, a dual polarized radar module arranged to transmit a radar signal towards a surface supporting the vehicle and to receive backscatter from the radar signal, and a load sensing arrangement, where the processing device is arranged to determine a parameter related to a normal force associated with at least one wheel of the heavy-duty vehicle by the load sensing arrangement, where the processing device is arranged to determine a parameter related to a friction coefficient of the surface by the radar module, where the processing device is arranged to determine a wheel force generating capability of the at least one wheel, based on the normal force related parameter and on the friction coefficient related parameter, where the wheel end module is arranged to output the wheel force generating capability on an output interface of the wheel end module.

2. The wheel end module according to claim 1, where the load sensing arrangement comprises a suspension displacement sensor and/or a suspension bellow pressure sensor arranged in connection to the at least one wheel, where the processing device is arranged to determine the normal force related parameter based on a predetermined relation between normal force and suspension displacement and/or suspension bellow pressure.

3. The wheel end module according to claim 1, where the radar module is arranged to determine a distance to the surface in connection to the at least one wheel based on the radar signal, where the processing device is arranged to determine the normal force related parameter based on the distance to the surface and on a predetermined relation between normal force and distance to the surface.

4. The wheel end module according to claim 1, where the processing device is arranged to determine the normal force related parameter as a preconfigured default value.

5. The wheel end module according to claim 1, where the radar module is configured to determine a velocity of the at least one wheel with respect to the surface, and where the wheel end module is arranged to output the velocity on the output interface.

6. The wheel end module according to claim 5, comprising at least one wheel speed sensor, or an interface to a wheel speed sensor, where the wheel speed sensor is arranged to determine respective rotational velocities of the at least one wheel, wherein the processing device is arranged to determine a wheel slip and/or a slip angle of the at least one wheel based on the rotational velocity and on the velocity of the at least one wheel with respect to the surface, where the wheel end module is arranged to output the wheel slip and/or the slip angle on the output interface.

7. The wheel end module according to claim 1, comprising an electric machine, where the processing device is arranged to control an axle speed of the electric machine based on a target wheel slip received on an input interface of the wheel end module.

8. A heavy-duty vehicle comprising a wheel end module according to claim 1.

9. A computer implemented method for determining a wheel force generating capability of at least one wheel on a heavy-duty vehicle, the method comprising transmitting a radar signal by a radar transceiver towards a surface supporting the vehicle, and receiving backscatter from the transmitted radar signal, where the radar signal comprises a first polarization component and a second polarization component different from the first polarization component, processing the received backscatter by a processing device to determine a parameter related to a friction coefficient of the surface, determining a parameter related to a normal force associated with the at least one wheel of the heavy-duty vehicle by a load sensing arrangement of the heavy-duty vehicle, and determining the wheel force generating capability of the of at least one wheel based on the normal force related parameter and on the friction coefficient related parameter.

10. The method according to claim 9, comprising determining the normal force related parameter based on a displacement or a bellow pressure associated with a suspension of the heavy-duty vehicle.

11. The method according to claim 9, comprising determining the normal force related parameter based on a distance to the surface determined based on the radar signal.

12. The method according to claim 9, comprising coordinating one or more motion support devices, MSD, based on the friction coefficient related parameter.

13. The method according to claim 9, comprising determining an operational design domain, ODD, of the heavy-duty vehicle comprising a maximum longitudinal velocity and/or a maximum lateral velocity at least partly based on the friction coefficient related parameter.

14. A computer program product comprising program code for performing, when executed by processing circuitry, the method of claim 9.

15. A non-transitory computer-readable storage medium comprising instructions, which when executed by processing circuitry, cause the processing circuitry to perform the method of claim 9.

* * * * *